United States Patent
Woo et al.

(10) Patent No.: US 8,614,704 B2
(45) Date of Patent: Dec. 24, 2013

(54) METHOD AND APPARATUS FOR RENDERING 3D GRAPHICS DATA

(75) Inventors: Sangoak Woo, Anyang-si (KR);
Dokyoon Kim, Seongnam-si (KR);
Keechang Lee, Yongin-si (KR);
Jeonghwan Ahn, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1344 days.

(21) Appl. No.: 11/344,152

(22) Filed: Feb. 1, 2006

(65) Prior Publication Data

US 2006/0170675 A1 Aug. 3, 2006

(30) Foreign Application Priority Data

Feb. 1, 2005 (KR) .................. 10-2005-0009107

(51) Int. Cl.
*G06T 15/00* (2011.01)
(52) U.S. Cl.
USPC ............................ 345/419; 345/522; 717/151
(58) Field of Classification Search
None
See application file for complete search history.

(56) References Cited

U.S. PATENT DOCUMENTS

| 6,417,858 B1* | 7/2002 | Bosch et al. ............... 345/522 |
| 6,707,462 B1* | 3/2004 | Peercy et al. ............... 345/619 |
| 7,084,878 B2* | 8/2006 | Herceg et al. ............... 345/555 |
| 7,100,157 B2* | 8/2006 | Collard ............... 717/161 |
| 7,103,882 B2* | 9/2006 | Kawahito ............... 717/151 |
| 7,162,716 B2* | 1/2007 | Glanville et al. ............... 717/151 |
| 7,268,785 B1* | 9/2007 | Glanville et al. ............... 345/506 |
| 7,353,341 B2* | 4/2008 | Kim et al. ............... 711/146 |
| 7,557,810 B2* | 7/2009 | Brown et al. ............... 345/522 |
| 8,214,819 B2* | 7/2012 | Mosberger ............... 717/163 |
| 2002/0080143 A1* | 6/2002 | Morgan et al. ............... 345/581 |
| 2004/0054834 A1* | 3/2004 | Devins et al. ............... 710/260 |
| 2005/0114850 A1* | 5/2005 | Chheda et al. ............... 717/151 |
| 2006/0005178 A1* | 1/2006 | Kilgard et al. ............... 717/153 |

FOREIGN PATENT DOCUMENTS

KR 10-2004-0076313 9/2004

OTHER PUBLICATIONS

Proudfoot et al., "A Real-Time Procedural Shading System for Programmable Graphics Hardware," Aug. 2001, ACM, p. 162.*
"Real-Time Rendering $2^{nd}$ Edition," Information and Culture Journal, Nov. 10, 2003, pp. 454-485.

* cited by examiner

*Primary Examiner* — Daniel Hajnik
*Assistant Examiner* — Andrew G Yang
(74) *Attorney, Agent, or Firm* — Staas & Halsey LLP

(57) ABSTRACT

A method and apparatus for rendering 3D graphics data. The method includes analyzing a characteristic of input 3D graphics data, reconstructing a rendering function based on the analyzed characteristic, and rendering the input 3D graphics data using the reconstructed rendering function. The characteristic of 3D graphics data to be rendered is analyzed and a rendering function is reconstructed only using code blocks corresponding to the analyzed characteristic, thereby minimizing the size of the rendering function.

25 Claims, 16 Drawing Sheets

FIG. 11

| IDENTIFIER | BRANCHING BLOCK |
|---|---|
| B1 | IS VERTEX FORMAT XYZRHW AND CLIPPING? |
| B2 | NOT CLIPPING OR VERTEX PROCESSING? |
| B3 | CLIPPING? |
| B4 | CAMERAVERTEX? |
| B5 | CAMERANORMAL? |
| B6 | DOES VERTEX FORMAT INCLUDE NORMAL? |
| B7 | SHOULD NORMALIZATION BE PERFORMED? |
| B8 | WRITING? |
| B9 | DONOTCOPYDATA? |
| B10 | FOG? |

FIG. 12

| IDENTIFIER | CODE BLOCK |
|---|---|
| C1 | TRANSFORM VERTEX FROM SCREEN COORDINATE SYSTEM TO CAMERA COORDINATE SYSTEM FOR CLIPPING |
| C2 | CREATE CLIP CODE |
| C3 | COPY DIFFUSE AND SPECULAR DATA |
| C4 | COPY TEXTURE COORDINATES |
| C5 | COVERT INPUT VERTEX INTO CAMERA COORDINATE SYSTEM |
| C6 | STORE CAMERA Z VALUE FOR FOG CALCULATION |
| C7 | PERFORM PROJECTION |
| C8 | APPLY VIEWPORT RELATED INFORMATION |
| C9 | CALCULATE CLIP CODE |
| C10 | STORE CLIP CODE |
| C11 | TRANSFORM INPUT VERTEX INTO CAMERA COORDINATE SYSTEM |
| C12 | TRANSFORM INPUT NORMAL INTO CAMERA COORDINATE SYSTEM |
| C13 | PERFORM NORMALIZATION OF NORMAL |
| C14 | INITIALIZE NORMAL |
| C15 | COPY DIFFUSE |
| C16 | COPY SPECULAR |
| C17 | CALCULATE BASIC AMBIENT |
| C18 | CALCULATE BASIC SPECULAR |
| C19 | CALCULATE EFFECT ACCORDING TO TYPE OF LIGHT SOURCE |
| C20 | UPDATE DIFFUSE VALUE |
| C21 | CALCULATE FOG VALUE ACCORDING TO FOG EQUATION |
| C22 | COPY TEXTURE COORDINATE OR CREATE TEXTURE |

FIG. 13B

RENDERING FUNCTION 2

| C5 |
|---|
| C6 |
| C12 |
| C15 |
| C16 |
| C21 |
| C22 |

FIG. 15

| IDENTIFIER | BRANCHING BLOCK |
|---|---|
| B11 | SHOULD Z TESTING BE PERFORMED? |
| B12 | SHOULD STENCIL TESTING BE PERFORMED? |
| B13 | IS CURRENT PIXEL PAINTED AS RESULT OF Z TESTING AND STENCIL TESTING? |
| B14 | DOES TEXTURE INFORMATION EXIST? |
| B15 | SHOULD PERSPECTIVE CORRECTION BE PERFORMED? |
| B16 | IS ENTIRE TEXTURE PROCESSING COMPLETED? |
| B17 | SHOULD ALPHA TESTING AND BLENDING BE PERFORMED? |
| B18 | SHOULD FOG CALCULATION BE PERFORMED? |

FIG. 16

| IDENTIFIER | CODE BLOCK |
|---|---|
| C23 | PERFORM Z TESTING |
| C24 | PERFORM STENCIL TESTING |
| C25 | PERFORM TEXTURE PROCESSING DURING PERSPECTIVE CORRECTION |
| C26 | PERFORM TEXTURE PROCESSING WITHOUT PERSPECTIVE CORRECTION |
| C27 | PERFORM ALPHA TESTING/BLENDING |
| C28 | CALCULATE FOG |
| C29 | PERFORM SPECULAR AND Z WRITING |
| C30 | PERFORM CALCULATED COLOR WRITING |

METHOD AND APPARATUS FOR RENDERING 3D GRAPHICS DATA

CROSS-REFERENCE TO RELATED APPLICATION

This application claims the benefit of Korean Patent Application No. 10-2005-0009107, filed on Feb. 1, 2005, in the Korean Intellectual Property Office, the disclosure of which is incorporated herein by reference.

BACKGROUND OF THE INVENTION

1. Field of the Invention

The present invention relates to a method and apparatus for rendering three-dimensional (3D) graphics data and a computer-readable recording medium having recorded thereon a program for implementing the method.

2. Description of the Related Art

As examples of 3D graphics data used in outputting devices for the 3D graphics data, there are standard file formats such as virtual reality modeling language (VRML) and moving picture expert group (MPEG) and file formats defined by general-purpose programs. The 3D graphics data includes geometrical information of an object in a 3D space, e.g., positions of 3D vertexes constituting the object and connection information of the 3D vertexes, material information of the object, e.g., the texture, transparency, and color of the object, the reflectivity of the surface of the object, and the position and characteristic of a light source, and change information of the geometrical information and the material information over time.

To read such 3D graphics data and output the same to a screen, an apparatus for parsing meaning from the read 3D graphics data and performing data transformation is required. Such an apparatus is usually called a 3D graphics rendering engine. The 3D graphics rendering engine includes a parser and a renderer. The parser reads 3D graphics data and parses meaning from the read 3D graphics data. In other words, the parser determines whether the read 3D graphics data is geometrical information of an object, material information of an object, or information about subordination between objects caused by a scene graph structure and parses meaning from the 3D graphics data.

The renderer renders a scene graph parsed by the parser and outputs the rendered scene graph.

However, such a conventional rendering engine is configured with one rendering function that includes all codes capable of processing 3D data. In other words, a conventional rendering engine performs rendering using only a single software code without considering the characteristic of 3D data to be rendered. Since the rendering function includes a large number of unnecessary codes that will not to be executed as well as codes that are to be executed according to the characteristic of 3D data to be rendered, its size is unnecessarily large. As the size of the rendering function increases, the rendering function cannot be loaded into a cache, resulting in an unnecessary cache miss.

Moreover, since the rendering function includes a conditional statement or a branching statement, a pipeline of a processor may be broken, causing performance degradation.

Thus, in a conventional rendering engine using a single rendering function that includes all codes required to render 3D data, degradation in speed at which 3D graphics data is rendered is inevitable.

BRIEF SUMMARY

An aspect of the present invention provides a method and apparatus for rendering 3D graphics data, which minimizes the size of a rendering function, and a computer-readable recording medium having recorded thereon a program for implementing the method.

According to an aspect of the present invention, there is provided a method of rendering 3D graphics data. The method includes analyzing the characteristic of input 3D graphics data, reconstructing a rendering function based on the analyzed characteristic, and rendering the input 3D graphics data using the reconstructed rendering function.

The reconstructing of the rendering function may include reconstructing the rendering function such that an element for determining whether to branch is not included in the rendering function.

The reconstructing of the rendering function may include reading a code block that is a meaningful functional unit, corresponding to the analyzed characteristic of the input 3D graphics data, from a code block memory and reconstructing the rendering function using the read code block.

The method may further include storing the reconstructed rendering function in a cache.

The method may further include deleting one of rendering functions stored in the cache, which is least used or recently least used, if there is no space for storing the reconstructed rendering function in the cache and storing the reconstructed rendering function in a space that has been occupied by the deleted rendering function.

The reconstructing of the rendering function may include searching for the rendering function corresponding to the analyzed characteristic of the input 3D graphics data from the cache, reading the rendering function from the cache if the rendering function exists in the cache, and reconstructing the rendering function based on the analyzed characteristic of the input 3D graphics data if the rendering function does not exist in the cache.

According to another aspect of the present invention, there is provided a method of rendering 3D graphics data. The method includes analyzing the characteristic of input 3D graphics data, reading at least one code block corresponding to the analyzed characteristic of the input 3D graphics data from a memory, reconstructing a rendering function by combining the at least one code block, and rendering the input 3D graphics data using the reconstructed rendering function.

According to still another aspect of the present invention, there is provided a method of reconstructing a rendering function to render 3D graphics data. The method includes dividing codes included in a rendering function into meaningful functional code blocks, extracting code blocks corresponding to the characteristic of 3D graphics data to be rendered, and reconstructing a rendering function by combining the extracted code blocks.

According to yet another aspect of the present invention, there is provided an apparatus for rendering 3D graphics data. The apparatus includes a rendering unit analyzing the characteristic of input 3D graphics data and reconstructing a rendering function based on the analyzed characteristic and a presenting unit rendering the input 3D graphics data using the reconstructed rendering function.

The rendering unit may include a cache searching unit searching for the rendering function corresponding to the analyzed characteristic of the input 3D graphics data from the cache, a function calling unit reading the rendering function from the cache if the rendering function exists in the cache, and a function reconstructing unit reconstructing the rendering function based on the analyzed characteristic of the input 3D graphics data if the rendering function does not exist in the cache.

According to yet another aspect of the present invention, there is provided an apparatus for rendering 3D graphics data. The apparatus includes a data analyzing unit analyzing the characteristic of input 3D graphics data and a function reconstructing unit reading at least one code block corresponding to the analyzed characteristic of the input 3D graphics data from a cache and reconstructing a rendering function by combining the at least one code block.

According to yet another aspect of the present invention, there is provided a computer-readable recording medium having recorded thereon processing instructions for causing a processor to execute a method of preventing an inclusion of unnecessary codes in a 3D graphics data rendering function, the method including: determining a characteristic of the 3D graphics data; and obtaining an suitable rendering function by: searching a cache for a rendering function corresponding to the characteristic and selecting the rendering function corresponding to the characteristic as the suitable rendering function when the rendering function corresponding to the characteristic is present in the cache; and reconstructing a rendering function corresponding to the characteristic as the suitable rendering function by reading and combining at least one code block corresponding to the characteristic when the rendering function corresponding to the characteristic is not present in the cache. The rendering function corresponding to the characteristic is a function having only codes necessary to render the 3D graphics data.

According to other aspects of the present invention, there are provided computer-readable recording media encoded with processing instructions for causing a processor to execute the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 11 illustrates contents of the branching blocks in the flowchart shown in FIG. 10;

FIG. 12 illustrates contents of the code blocks in the flowchart shown in FIG. 10;

FIGS. 13A and 13B illustrate examples of a rendering function that can be created in the flow shown in FIG. 10;

FIG. 15 illustrates contents of the branching blocks in the flow shown in FIG. 14;

FIG. 16 illustrates contents of the code blocks in the flow shown in FIG. 14.

DETAILED DESCRIPTION OF EMBODIMENTS

Figure 1:
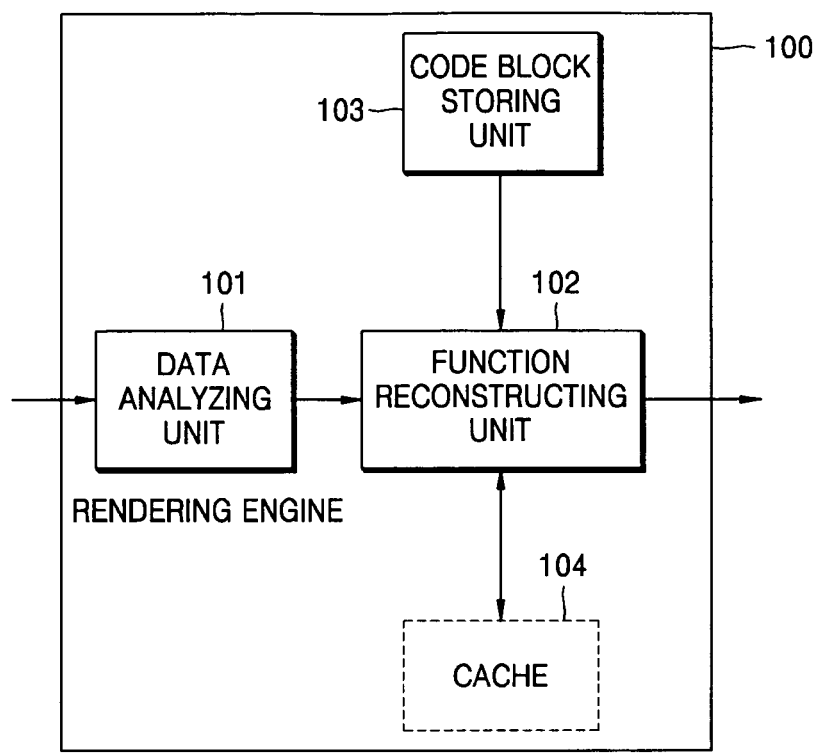
FIG. 1 is a schematic block diagram of an apparatus for rendering 3D graphics data according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

To prevent degradation in 3D graphics data rendering performance, in various embodiments of the present invention, a rendering function is reconstructed according to the characteristic of input 3D data and the input 3D data is rendered using the reconstructed rendering function, instead of rendering the input 3D data using a single rendering function that includes all codes applied to all 3D data.

A rendering engine according to an embodiment of the present invention groups codes included in a conventional rendering function into meaningful code blocks, stores the meaningful code blocks, and reconstructs a new rendering function using only a necessary code block according to the characteristic of input 3D data. The rendering engine also stores the once-reconstructed rendering function in a cache and uses the rendering function stored in the cache without creating a new rendering function when input data whose characteristic is similar to the stored rendering function is to be rendered, thereby saving rendering time.

FIG. 1 is a schematic block diagram of an apparatus for rendering 3D graphics data according to an embodiment of the present invention.

Referring to FIG. 1, the apparatus includes a rendering engine 100.

Upon input of 3D graphics data to be rendered, the rendering engine 100 analyzes the characteristic of the input 3D graphics data, reconstructs a rendering function using a code block corresponding to the characteristic of the input 3D graphics data based on a result of analysis and calls the reconstructed rendering function to render the input 3D graphics data.

The rendering engine 100 includes a data analyzing unit 101, a function reconstructing unit 102, a code block storing unit 103, and a cache 104.

The data analyzing unit 101 receives 3D graphics data to be rendered and analyzes the characteristic of the received 3D graphics data. The 3D graphics data input to the data analyzing unit 101 includes information about the characteristic of 3D vertexes, information about the characteristic of a primitive that is a meaningful group of the 3D vertexes, render state information related to vertex processing, and render state information related to pixel processing.

Hereinafter, a description will be made regarding such information included in the 3D graphics data.

A. Information about the Characteristic of 3D Vertexes
   i. Position: Positions of 3D vertexes. (X, Y, Z) represents a basic 3D vertex position and (X, Y, Z, W) represents a transformed 3D vertex position.
   ii. Normal
   iii. Diffuse color (color reflected from a vertex)
   iv. Specular color: Shiny color used to give an object a shiny appearance.
   v. Texture coordinate: Coordinates of texture information. There may be at least one and up to 4-8 texture coordinates according to hardware.
B. Information about the Characteristic of a Primitive
   i. Group of vertexes
   ii. Group of lines
   A line list indicates that lines separately exist. For example, if positions are A, B, C, and D, there are two lines, i.e., A-B and C-D.
   A line strip indicates that lines overlap. For example, if positions are A, B, C, and D, there are three lines, i.e., A-B, B-C, and C-D.
   iii. Group of triangles
   A triangle list indicates that triangles separately exist. For example, if positions are A, B, C, D, E, and F, there are two triangles, i.e., (A B C) and (D E F).
   A triangle strip indicates that triangles overlap. For example, if positions are A, B, C, D, E, and F, there are four triangles, i.e., (A B C), (B C D), (C D E), and (D E F).
   A triangle fan indicates that triangles overlap around their center. For example, if positions are A, B, C, D, E, and F, there are four triangles, i.e., (A B C), (A C D), (A D E), and (A E F).
   iv. Number of vertexes
   v. Presence of an index and the index
   An index indicates that the order of vertexes is determined using an index instead of an input order the vertexes when there exists a group of vertexes constituting a triangle.
C. Render State Information Related to Vertex Processing
   i. Whether to clip: Clipping is a process of eliminating a primitive (vertex, line, or triangle) located outside a screen.
   ii. Whether to perform only vertex processing: If it is determined to perform only vertex processing, pixel processing is not performed.
   iii. Whether to transform into camera coordinates
   iv. Whether to perform transformation using a camera normal
   v. Whether to give a light source effect
   vi. Type of a light source
   vii. Whether to give a fog effect
   viii. Final fog value and type of a fog effect
D. Render State Information Related to Pixel Processing
   i. Whether to perform Z testing (or depth testing): Z testing is performed to cause a vertex that is near to a camera to be seen and a vertex that is far from the camera not to be seen.
   ii. Method of Z testing
   iii. Whether to perform Z writing: Whether to write a Z value (depth value) to a Z buffer (to which only a depth value of each vertex without a color value of each vertex is written) after Z testing.
   iv. Whether to use a stencil buffer: A stencil buffer separately exists to express a shadow.
   v. Type of stencil testing
   vi. Texture perspective: A technique for preventing texture information from changing according to a distance or minimizing a change in texture information.
   vii. Number of used texture information
   viii. Type of operation used in texture information
   ix. Whether to use specular and a specular value
   x. Whether to use a fog effect, a fog value, and the type of the fog effect
   xi. Whether to perform alpha blending and the type of alpha blending
   xii. Whether to perform dithering: Dithering is a technique for properly simulating unavailable colors of a picture using a limited number of colors.

The code block storing unit 103 stores code blocks, each of which is a group of meaningful functional codes. Examples of the code blocks are shown in FIGS. 12 and 16. The code blocks shown in FIG. 12 are designed for vertex processing, and the code blocks shown in FIG. 16 are designed for pixel processing. Each code block is a group of commands that perform a predetermined meaningful function. Rendering is conventionally performed using a rendering function that includes all the code blocks shown in FIG. 12 or 16. However, in the present embodiment, since code blocks that should be processed according to the characteristic of 3D graphics data to be rendered are extracted from the code blocks shown in FIG. 12 and a rendering function is reconstructed with only the extracted code blocks, it is possible to prevent unnecessary code blocks to be included in the rendering function. In addition, since only code blocks that should be processed according to the characteristic of 3D graphics data to be rendered are included in a rendering function, it is possible to prevent a branching block or a conditional statement from being included in the rendering function.

The function reconstructing unit 102 reads code blocks corresponding to the characteristic information analyzed by the data analyzing unit 101 from the code block storing unit 103 and combines the read code blocks to reconstruct a rendering function corresponding to the characteristic of the input 3D graphics data. The reconstructed rendering function is called to render the input 3D graphics data.

Since there may be at least one object whose characteristics are similar to each other due to the nature of 3D graphics data, the once-reconstructed rendering function may be stored for next use. The cache 104 shown in FIG. 1 stores the reconstructed rendering function.

The function reconstructing unit 102 stores the reconstructed rendering function in the cache 104. During next rendering, the function reconstructing unit 102 first searches for a rendering function corresponding to the characteristic of input 3D graphics data from the cache 104. If the rendering function is found from the cache 104, the function reconstructing unit 102 calls the found rendering function from the cache 104 to render the input 3D graphics data without reading code blocks from the code block storing unit 103.

Since the cache 104 is employed to improve the effect of a method of rendering 3D graphics data according to the present embodiment, it is expressed with dotted lines in FIG. 1 to indicate that it is not essential for the present invention, but instead optional.

Figure 2:
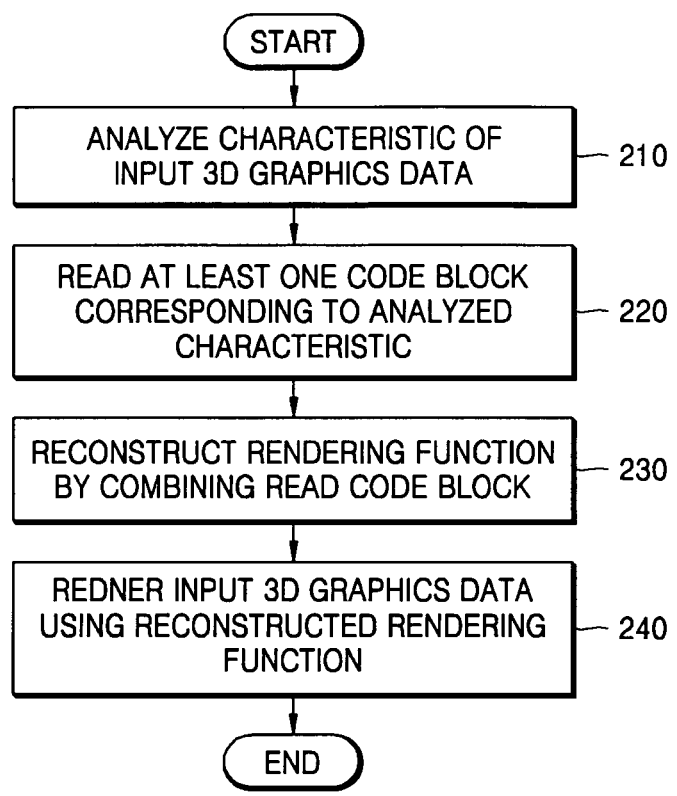
FIG. 2 is a flowchart illustrating a method for rendering 3D graphics data according to an embodiment of the present invention.

FIG. 2 is a flowchart illustrating a method of rendering 3D graphics data according to an embodiment of the present invention.

Referring to FIGS. 1 and 2, the data analyzing unit 101 of the rendering engine 100 analyzes the characteristic of input 3D graphics data in operation 210 and provides the analyzed characteristic information to the function reconstructing unit 102.

The function reconstructing unit 102 reads at least one code block corresponding to the analyzed characteristic information from the code block storing unit 104 in operation 220.

The function reconstructing unit 102 then reconstructs a rendering function by combining the read code blocks in operation 230 and renders 3D graphics data using the reconstructed rendering function in operation 240.

Figure 3:
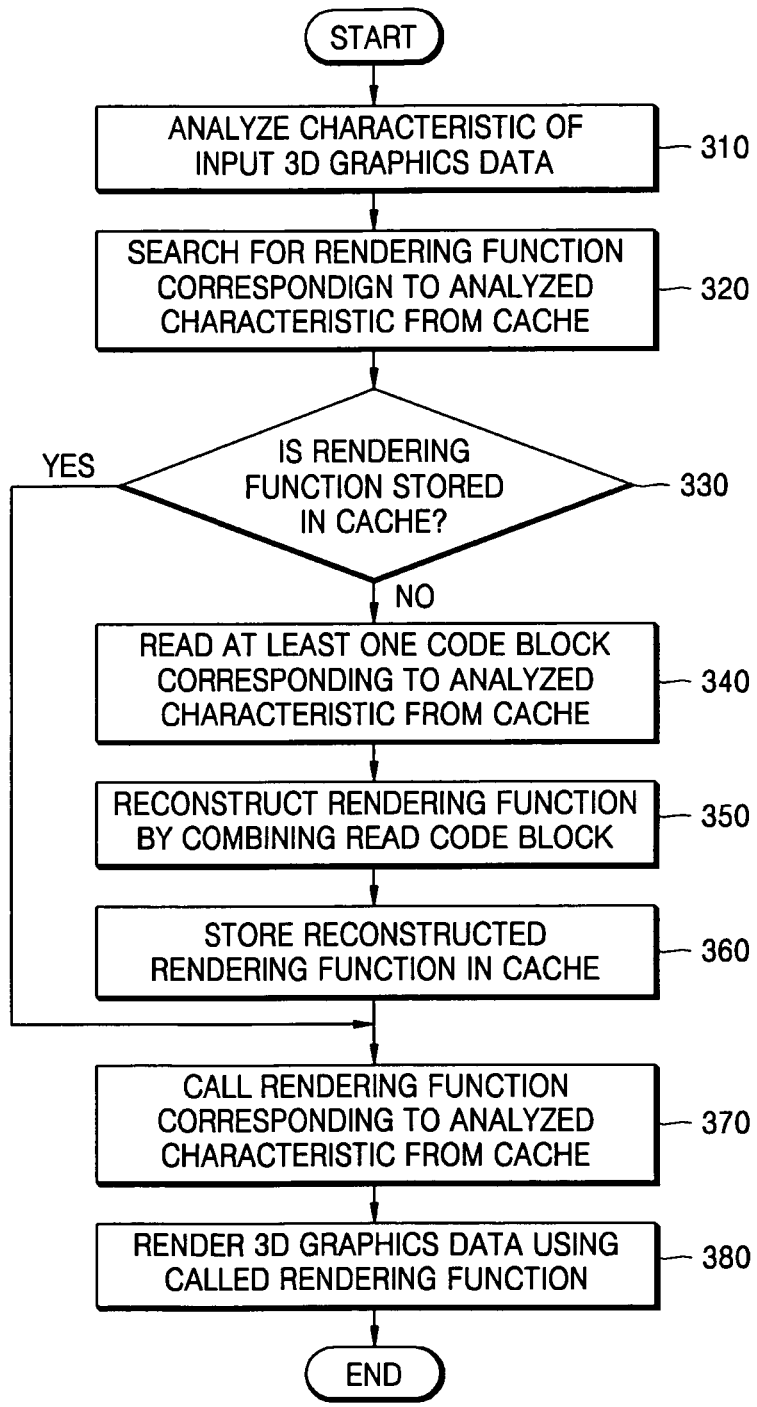
FIG. 3 is a flowchart illustrating a method for rendering 3D graphics data according to another embodiment of the present invention.

FIG. 3 is a flowchart illustrating a method for rendering 3D graphics data according to another embodiment of the present invention.

Referring to FIGS. 1 and 3, the data analyzing unit 101 of the rendering engine 100 analyzes the characteristic of input 3D graphics data in operation 310 and outputs the analyzed characteristic information to the function reconstructing unit 102.

The function reconstructing unit 102 searches for a rendering function corresponding to the received characteristic information from the cache 104 in operation 320 to determine whether the rendering function corresponding to the analyzed characteristic information is stored in the cache 104 in operation 330.

If the rendering function corresponding to the analyzed characteristic information is stored in the cache 104, the function reconstructing unit 102 calls the rendering function from the cache 104 in operation 370 to render the input 3D graphics data in operation 380.

If the rendering function corresponding to the analyzed characteristic information is not stored in the cache 104, the function reconstructing unit 102 reads at least code block corresponding to the analyzed characteristic information from the code block storing unit 103 in operation 340. The function reconstructing unit 102 reconstructs a rendering function by combining the code blocks read from the function reconstructing unit 102 in operation 350 and stores the reconstructed rendering function in the cache 104 in operation 360.

The function reconstructing unit 102 calls the reconstructed rendering function from the cache 104 in operation 370 to render the input 3D graphics data in operation 380.

Figure 4:
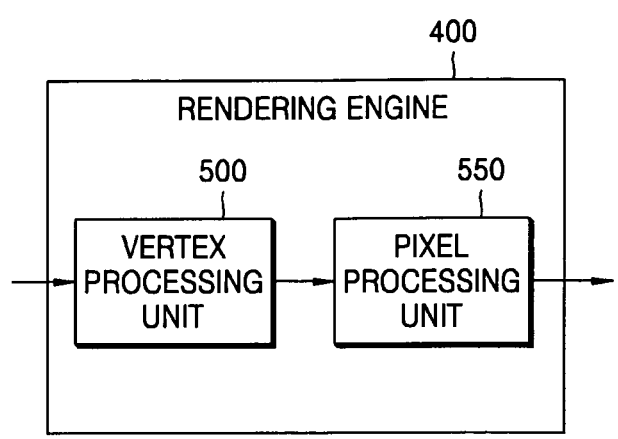
FIG. 4 illustrates a detailed example of the apparatus shown in FIG. 1.

FIG. 4 illustrates a detailed example of the apparatus shown in FIG. 1.

Referring to FIG. 4, the apparatus includes a rendering engine 400.

The rendering engine 400 includes a vertex processing unit 500 and a pixel processing unit 550.

The vertex processing unit 500 receives 3D graphics data to be rendered, analyzes characteristic information related to vertex processing, and reconstructs a rendering function related to vertex processing corresponding to the analyzed characteristic information. Vertex processing converts 3D information from 3D graphics data to be rendered into 2D information.

The pixel processing unit 550 receives data that undergoes vertex processing through the vertex processing unit 500, analyzes characteristic information related to pixel processing, and reconstructs a rendering function related to pixel processing corresponding to the analyzed characteristic information. Pixel processing involves processing such as filling in the internal face of a 2D triangle based on the 2D information obtained through vertex processing.

The vertex processing unit 500 and the pixel processing unit 550 analyzes different information, but are similar in their functions of analyzing characteristic information and reconstructing a rendering function.

Figure 5:
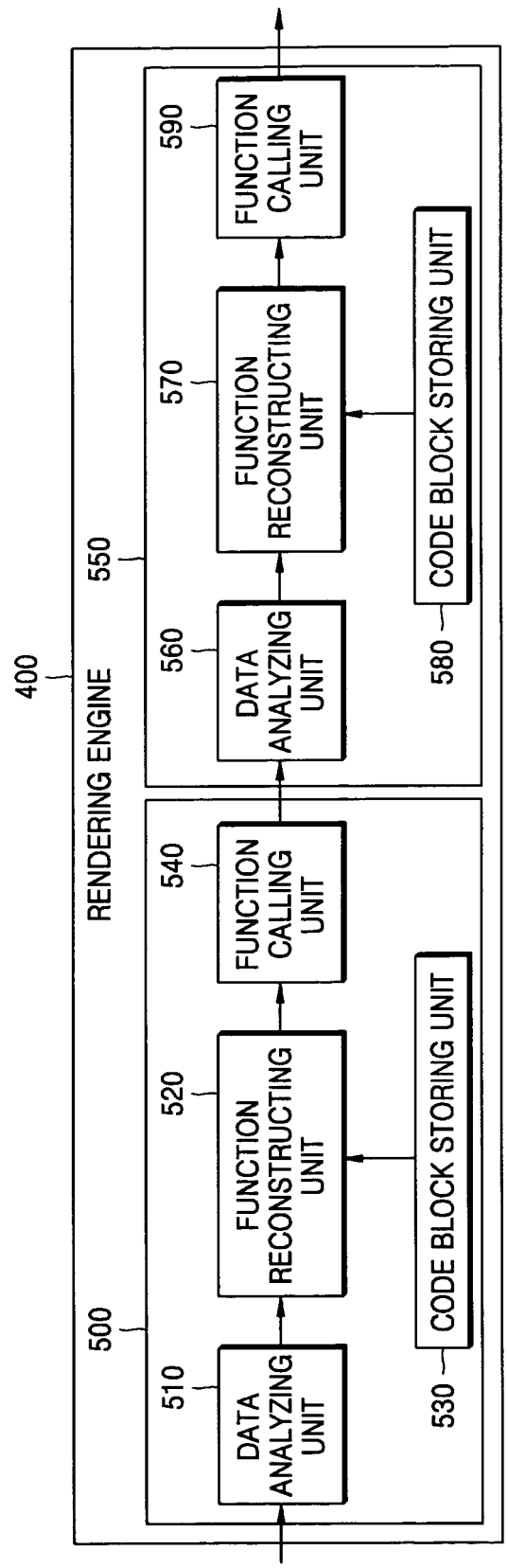
FIG. 5 illustrates a detailed example of a rendering engine shown in FIG. 4.

FIG. 5 illustrates a detailed example of the rendering engine 400 shown in FIG. 4.

Referring to FIG. 5, the rendering engine 400 includes the vertex processing unit 500 and the pixel processing unit 550.

The vertex processing unit 500 includes a data analyzing unit 510, a function reconstructing unit 520, a code block storing unit 530, and a function calling unit 540.

The data analyzing unit 510 analyzes the characteristic of input 3D graphics data, searches for characteristic information related to vertex processing, and provides the characteristic information related to vertex processing to the function reconstructing unit 520.

The function reconstructing unit 520 reads at least one code blocks corresponding to the received characteristic information related to vertex processing from the code block storing unit 530 and reconstructs a rendering function related to vertex processing by combining the read code blocks. The function reconstructing unit 520 outputs the input 3D graphics data that undergoes vertex processing to the pixel processing unit 550.

The code block storing unit 530 stores code blocks related to vertex processing. The code block storing unit 530 may store, for example, a set of code blocks shown in FIG. 12.

The function calling unit 540 calls the reconstructed rendering function related to vertex processing to render the input 3D graphics data.

The pixel processing unit 550 includes a data analyzing unit 560, a function reconstructing unit 570, a code block storing unit 580, and a function calling unit 590.

The data analyzing unit 560 receives data that undergoes vertex processing from the vertex processing unit 500, analyzes the characteristic of the received data to search for characteristic information related to pixel processing, and provides the found characteristic information related to pixel processing to the function reconstructing unit 570.

The function reconstructing unit 570 reads at least one code block corresponding to the received characteristic information related to pixel processing from the code block storing unit 580 and reconstructs a rendering function related to pixel processing by combining the read code blocks.

The code block storing unit 580 stores code blocks related to pixel processing. The code block storing unit 580 may store, for example, a set of code blocks as shown in FIG. 16.

The function calling unit 590 calls the reconstructed rendering function related to pixel processing to render the input 3D graphics data.

Figure 6:
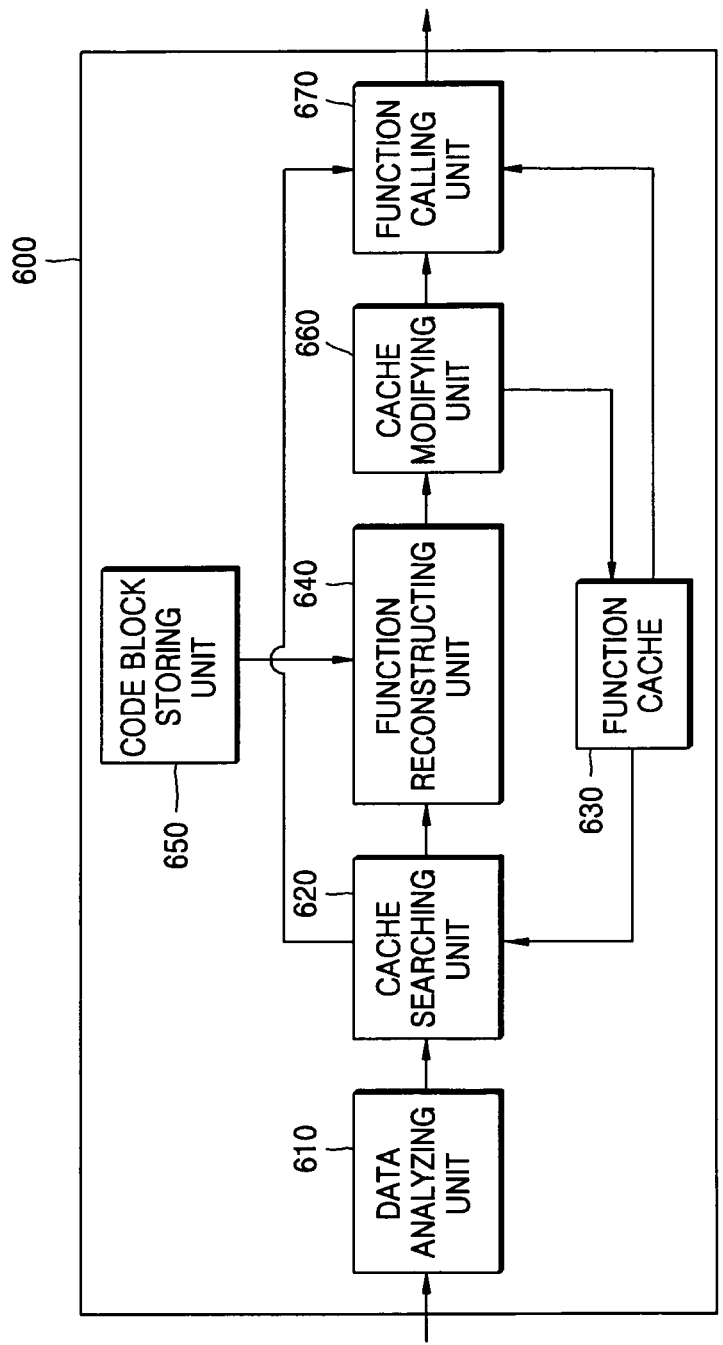
FIG. 6 illustrates another example of a vertex processing unit shown in FIG. 4.

FIG. 6 illustrates another example of the vertex processing unit 500 shown in FIG. 4. Although only a vertex processing unit 600 is shown in FIG. 6, the pixel processing unit 550 may also be configured in the same manner as the vertex processing unit 600 shown in FIG. 6.

Referring to FIG. 6, the vertex processing unit 600 includes a data analyzing unit 610, a cache searching unit 620, a function cache 630, a function reconstructing unit 640, a code block storing unit 650, a cache modifying unit 660, and a function calling unit 670.

The data analyzing unit 610 analyzes the characteristic of input 3D graphics data, searches for characteristic information related to vertex processing, and provides the characteristic information related to vertex processing to the cache searching unit 620.

The cache searching unit 620 searches for a rendering function corresponding to the characteristic information related to vertex processing received from the data analyzing unit 610 from the function cache 630. If the rendering function corresponding to the characteristic information related to vertex processing is found from the function cache 630, the cache searching unit 620 gives a control signal to the function calling unit 670 to cause the function calling unit 670 to call the found rendering function from the function cache 630.

Unless the rendering function corresponding to the characteristic information related to vertex processing is found from the function cache 630, the cache searching unit 620 gives a control signal to the function reconstructing unit 640.

The function reconstructing unit 640 receives the control signal from the cache searching unit 620, reads code blocks corresponding to the characteristic information related to vertex processing from the code block storing unit 650, and reconstructs a rendering function by combining the read code blocks. The function reconstructing unit 640 provides the reconstructed rendering function to the cache modifying unit 660.

The cache modifying unit 660 stores the received rendering function in the function cache 630. At this time, if there is a space for storing the received rendering function in the function cache 630, the cache modifying unit 660 stores the received rendering function in that space. However, if there is no space for storing the received rendering function in the function cache 630, the cache modifying unit 660 deletes one of rendering functions that have been stored in the function cache 630 and stores the received function in a space that has been occupied by the deleted rendering function.

Figure 7:
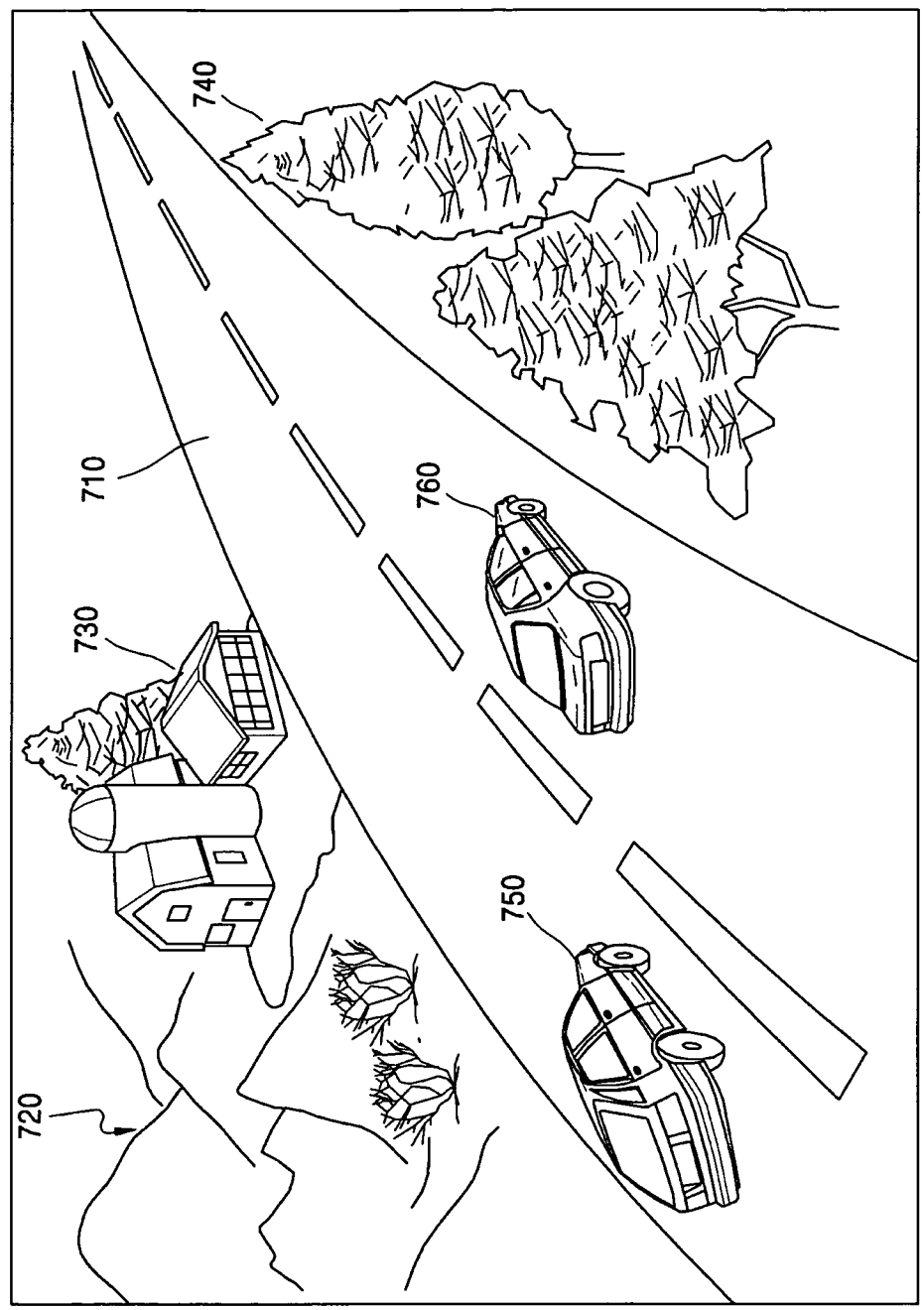
FIG. 7 illustrates an example of 3D graphics.

FIG. 7 illustrates an example of 3D graphics. In FIG. 7, objects to be rendered are a road 710, grass 720, a house 730, a tree 740, a first car 750, and a second car 760. The method for rendering 3D graphics data according to the present embodiment includes first analyzing the characteristic of the road 710, creating a rendering function according to the analyzed characteristic, rendering the road 710, analyzing the characteristic of the grass 720, creating a rendering function according to the analyzed characteristic, calling a rendering function for rendering, analyzing the characteristic of the house 730, creating a rendering function according to the analyzed characteristic, calling a rendering function for rendering, analyzing the characteristic of the tree 740, creating a rendering function according to the analyzed characteristic, calling a rendering function for rendering, analyzing the characteristic of the first car 750, creating a rendering function according to the analyzed characteristic, calling a rendering function for rendering, analyzing the characteristic of the second car 760, creating a rendering function according to the analyzed characteristic, and calling a rendering function for rendering. A presentation engine provided with rendering functions for data to be rendered displays 3D graphics data on a screen using the provided rendering functions.

At this time, since the characteristics of the first car 750 and the second car 760 are similar to each other, once the rendering function for the first car 750 is stored in a cache, the rendering function for the first car 750 stored in the cache can be used for the second car 760 without creating a new rendering function for the second car 760. By calling a rendering function that has been already created from a cache and using the called rendering function, time required to create rendering functions can be saved.

Figure 8:
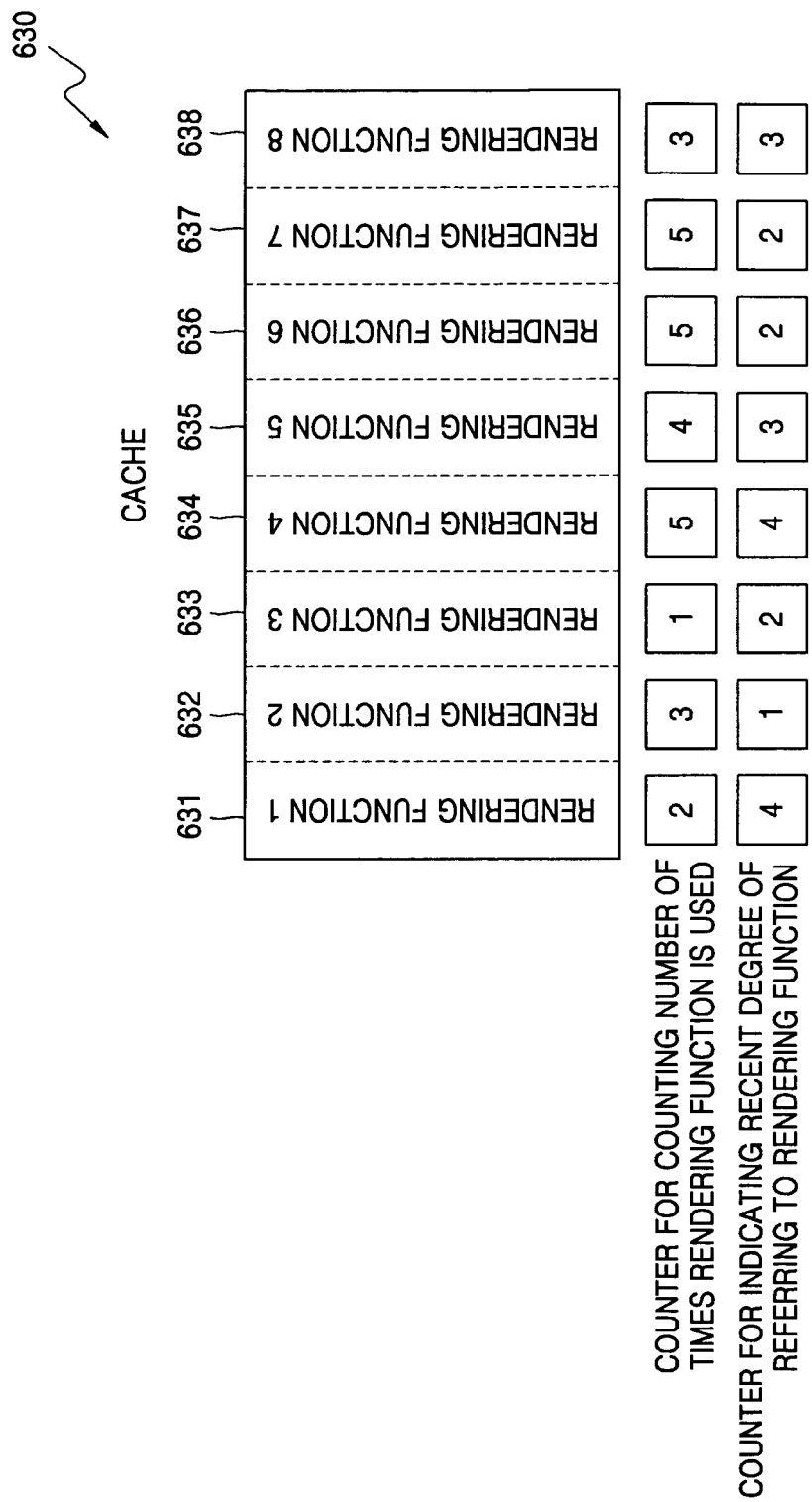
FIG. 8 illustrates a detailed example of a function cache shown in FIG. 6.

FIG. 8 illustrates a detailed example of the function cache 630 shown in FIG. 6.

Referring to FIG. 8, the function cache 630 is divided into 8 blocks, each of which can store one rendering function. Thus, the function cache 630 can store a total of 8 rendering functions. For example, a first block 631 stores a rendering function 1, a second block 632 stores a rendering function 2, a third block 633 stores a rendering function 3, a fourth block 634 stores a rendering function 4, a fifth block 635 stores a rendering function 5, a sixth block 636 stores a rendering function 6, a seventh block 637 stores a rendering function 7, and an eighth block 638 stores a rendering function 8.

Two counters are provided for each block.

Among the two counters for each block, one is a counter that counts a total number of times a corresponding rendering function is used and the other is a counter that counts a total number of times a corresponding rendering function is recently used.

The counter that counts a total number of times a rendering function is used is initialized to 0 when the rendering function is first stored in a corresponding block of the function cache 630 and counts 1 every time the rendering function stored in the corresponding block is used. It can be seen from FIG. 8 that the rendering function 1 is used two times and the rendering function 2 is used three times.

The counter that counts the total number of times a corresponding rendering function is recently used counts 1 every time the rendering function stored in a corresponding block is referred to. To indicate the recent degree of referring to a corresponding rendering function, the counter should be updated at predetermined time intervals.

The counters are used to select a rendering function to be deleted when one of rendering function needs to be deleted.

In other words, when rendering functions have been already stored in all the blocks of the function cache 630 and thus there is no block for storing a newly created rendering function, one of the rendering functions stored in the blocks should be deleted. At this time, as one of efficient deletion methods, a rendering function that is least used or referred to may be deleted. Referring to FIG. 8, if a rendering function to be deleted is selected based on a counter value of the counter that counts a total number of times a rendering function is used, a counter value of the counter corresponding to the rendering function 3 is smallest as 1. Thus, the rendering function 3 is deleted from the third block 633 and a newly created rendering function is stored in the third block 633. If a rendering function to be deleted is selected based on a counter value of the counter that indicates the recent degree of referring to a rendering function, a counter value of the counter corresponding to the rendering function 2 is smallest as 1. Thus, the rendering function 2 is deleted from the second block 632 and a newly created rendering function is stored in the second block 632. Alternatively, a rendering function to be deleted may be selected by properly using both the two counters. Also, it is to be understood that a method of selecting a rendering function to be deleted varies with a cache policy.

The function calling unit 670 receives a control signal from the cache modifying unit 660 or the cache searching unit 620 and calls a rendering function from the function cache 630 to render the input 3D graphics data.

Figure 9:
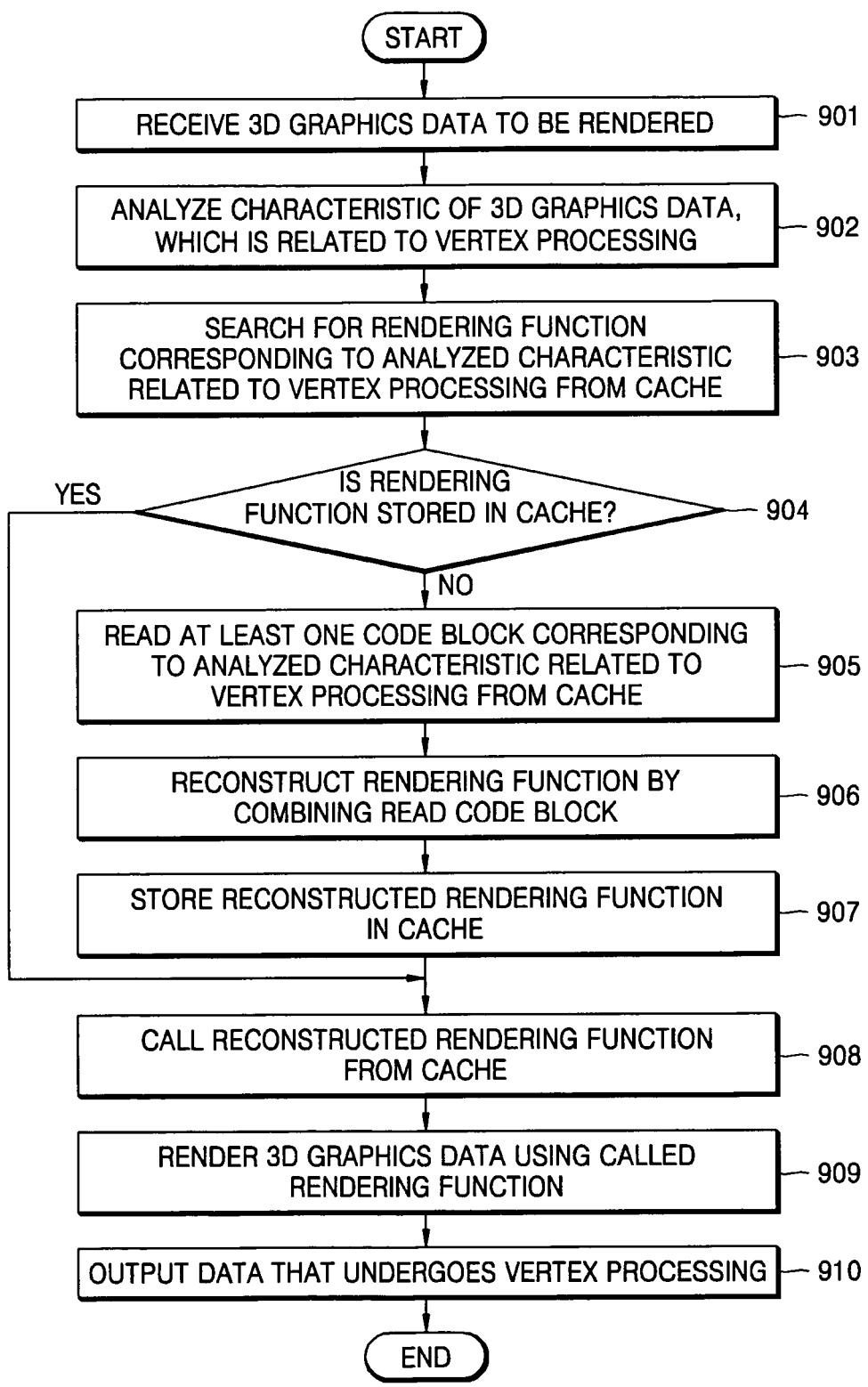
FIG. 9 is a flowchart illustrating a rendering process in the vertex processing unit shown in FIG. 6.

FIG. 9 is a flowchart illustrating a rendering process in the vertex processing unit 600 shown in FIG. 6. The pixel processing unit 550 also performs a rendering function that is same as in the vertex processing unit 600.

The vertex processing unit 600 receives 3D graphics data to be rendered.

The data analyzing unit 610 of the vertex processing unit 600 analyzes characteristic information related to vertex processing of the input 3D graphics data in operation 902 and outputs the analyzed characteristic information to the cache searching unit 620.

The cache searching unit 620 searches for a rendering function corresponding to the analyzed characteristic information related to vertex processing from the function cache 630 in operation 903 to determine whether the rendering function is stored in the function cache 630 in operation 904.

If the rendering function corresponding to the analyzed characteristic information related to vertex processing is stored in the function cache 630, the function calling unit 670 calls the rendering function corresponding to the analyzed characteristic information from the function cache 630 in operation 908 to render the input 3D graphics data.

Unless the rendering function corresponding to the analyzed characteristic information related to vertex processing is stored in the function cache 630, the function reconstructing unit 640 reads at least one code blocks corresponding to the analyzed characteristic information related to vertex processing from the code block storing unit 650 in operation 905. The function reconstructing unit 640 reconstructs a rendering function by combining the read code blocks in operation 906, and the cache modifying unit 660 stores the reconstructed rendering function in the function cache 630 in operation 907. At this time, if there is no space for storing the reconstructed rendering function in the function cache 630, the cache modifying unit 660 deletes one of rendering functions that have been already stored in the function cache 630 based on the above-described cache policy and stores the reconstructed rendering function in a space that has been occupied by the deleted rendering function.

The function calling unit 670 then calls a rendering function corresponding to the analyzed characteristic information from the function cache 630 and renders 3D graphics data in operation 908. The function calling unit 670 outputs data that undergoes vertex processing to the pixel processing unit in operation 910.

Hereinafter, reconstruction of a rendering function using code blocks will be described in detail.

Figure 10:
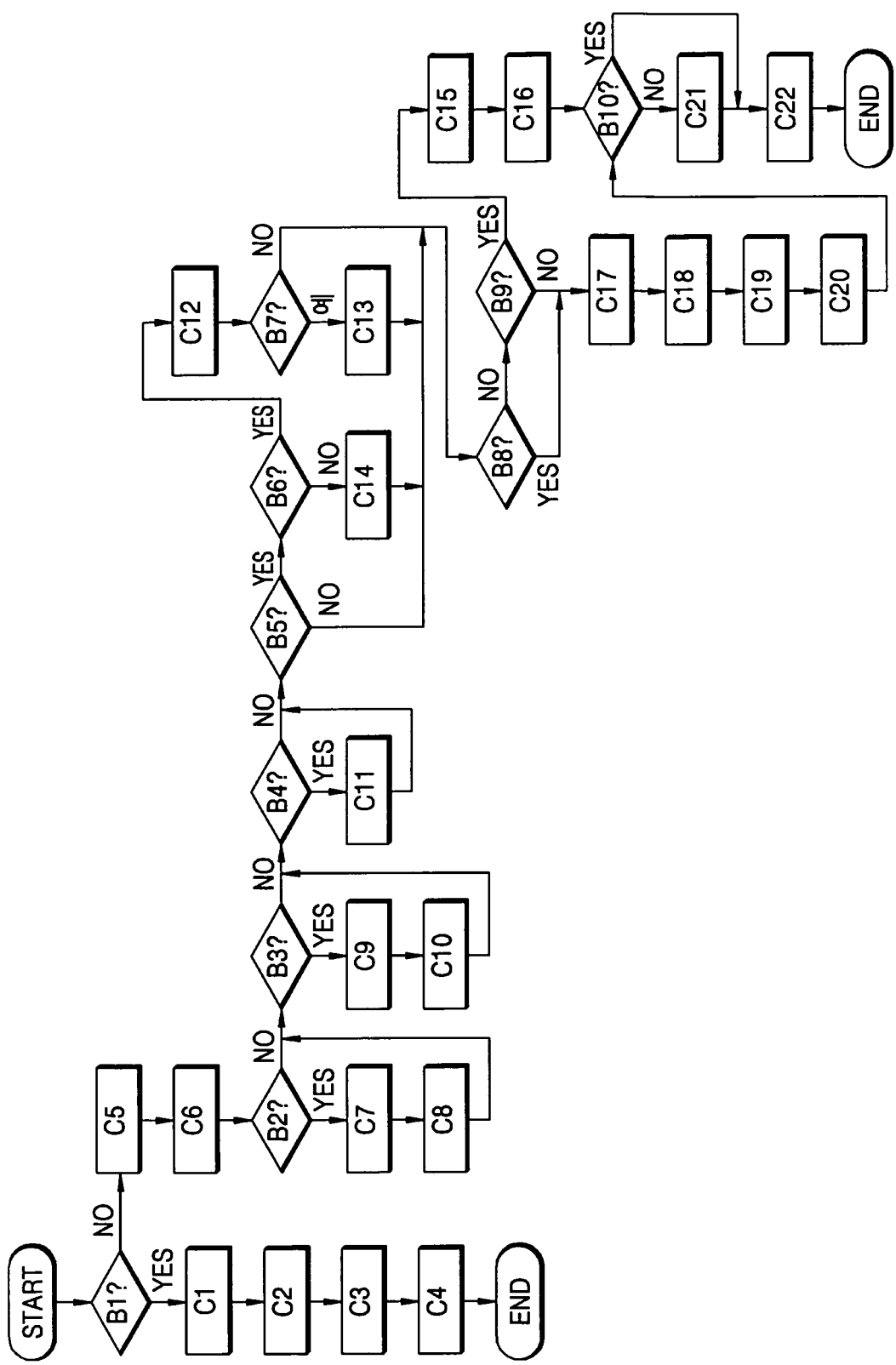
FIG. 10 illustrates a flow in vertex processing where branching blocks and code blocks are mixed.

FIG. 10 illustrates a flow in vertex processing where branching blocks and code blocks are mixed.

A branching block means a conditional statement or a branching statement to analyze the characteristic of 3D graphics data and determine which code block is to be executed according to the analyzed characteristic.

A code block means a group of meaningful functional codes that should be executed according to the characteristic of 3D graphics data.

Conventionally, 3D graphics data has been rendered using a single rendering function including all the branching codes and code blocks related to vertex processing as shown in FIG. 10.

However, in the present embodiment, the characteristic of 3D graphics data to be rendered is analyzed and a rendering function is reconstructed only with code blocks required according to the analyzed characteristic. Here, an analysis of the characteristic of 3D graphics data is made based on a decision in each branching block.

Referring to FIG. 10, the entire flow related to vertex processing is as follows.

After the characteristic of input 3D graphics data related to vertex processing is analyzed, if a decision result in a branching block B1 is YES, code blocks C1, C2, C3, and C4 are executed and vertex processing is terminated. If the decision result is NO, code blocks C5 and C6 are executed and a decision is made in a branching block B2. If a decision result in the branching block B2 is YES, code blocks C7 and C8 are executed. If the decision result in the branching block B2 is NO, a decision is made in a branching block B3. If a decision result in the branching block B3 is YES, code blocks C9 and C10 are executed. If the decision result in the branching block B3 is NO, a decision is made in a branching block B4. If a decision result in the branching block B4 is YES, a code block C11 is executed. If the decision result in the branching block B4 is NO, a decision is made in a branching block B5. If a decision result in the branching block B5 is YES, a decision is made in a branching block B6. If the decision result in the branching block B5 is NO, a decision is made in a branching block B8. If a decision result in the branching block B6 is NO, a code block C14 is executed. If the decision result in the branching block B6 is YES, a code block C12 is executed and a decision is made in a branching block B7. If a decision result in the branching block B7 is YES, a code block C13 is executed. If the decision result in the branching block B7 is NO, a decision is made in the branching block B8. If a decision result in the branching block B8 is YES, code blocks C17 through C20 are executed. If the decision result in the branching block B8 is NO, a decision is made in a branching block B9. If a decision result in the branching block B9 is NO, the code blocks C17 through C20 are executed. If the decision result in the branching block B9 is YES, the code blocks C15 and C16 are executed and a decision is made in a branching block B10. If a decision result in the branching block B10 is NO, code blocks C21 and C22 are executed and vertex processing is terminated. If the decision result in the branching block B10 is YES, a code block C22 is executed and vertex processing is terminated.

The code block storing unit 650 stores the code blocks C1 through C22 related to vertex processing as shown in FIG. 12.

The data analyzing unit 610 analyzes the characteristic of 3D graphics data to be rendered using the branching blocks B1 through B10 as shown in FIG. 11, reads code blocks corresponding to the analyzed characteristic among the code blocks as shown in FIG. 12, and reconstructs a rendering function with the read code blocks.

Since the contents of the branching blocks B1 through B10 shown in FIG. 11 and the code blocks C1 through C22 shown in FIG. 12 are only examples of branching blocks and code blocks required for vertex processing and fall beyond the scope of the present invention, they will not described in detail.

FIGS. 13A and 13B illustrate examples of a rendering function that can be created in the flow shown in FIG. 10.

Referring to FIG. 13A a rendering function 1 is comprised of the code blocks C1 through C4.

Referring to FIGS. 10 and 11, if a vertex format is XYZRHW and clipping as a result of decision in the branching block B1, the code blocks C1 through C4 should be executed. Thus, the function reconstructing unit 640 reads the code blocks C1 through C4 among the code blocks C1 through C22 shown in FIG. 12 and reconstructs the rendering function 1 with the read code blocks C1 through C4.

Referring to FIG. 13B, a rendering function 2 is comprised of the code blocks C5, C6, C12, C15, C16, C21, and C22.

Referring to FIGS. 10 and 11, the data analyzing unit 610 analyzes the characteristic of input 3D graphics data, decides NO as a decision in the branching block B1 in which it is determined whether a vertex format is XYZRHW and clipping, decides NO as a decision in the branching block B2 in which it is determined whether the vertex format is not clipping or is subject to vertex processing, decides NO as a decision in the branching block B3 in which it is determined whether the vertex format is clipping, decides NO as a decision in the branching block B4 in which it is determined whether the vertex format is CAMERAVERTEX, decodes YES as a decision in the branching block B5 in which it is determined whether the vertex format is CAMERANORMAL, decides YES as a decision in the branching block B6 in which it is determined whether the vertex formal includes a normal, decides NO as a decision in the branching block B7 in which it is determined whether normalization should be performed, decides NO as a decision in the branching block B8 in which it is determined whether writing should be performed, decides YES as a decision in the branching block B9 in which it is determined whether DONOTCOPYDATA is or not, and decides NO as a decision in the branching block B10 in which it is determined whether fog is or not. The data analyzing unit 610 provides characteristic information of 3D graphics data, which is related to vertex processing, to the function reconstructing unit 640.

The function reconstructing unit 640 reads the code blocks C5, C6, C12, C15, C16, C21, and C22 corresponding to the received characteristic information related to vertex processing among the code blocks C1 through C22 as shown in FIG. 12 and reconstructs a rendering function by combining the read code blocks C5, C6, C12, C15, C16, C21, and C22. The reconstructed rendering function includes only code blocks that should be processed according to the characteristic of 3D graphics data to be rendered, but does not include any branching block.

Figure 14:
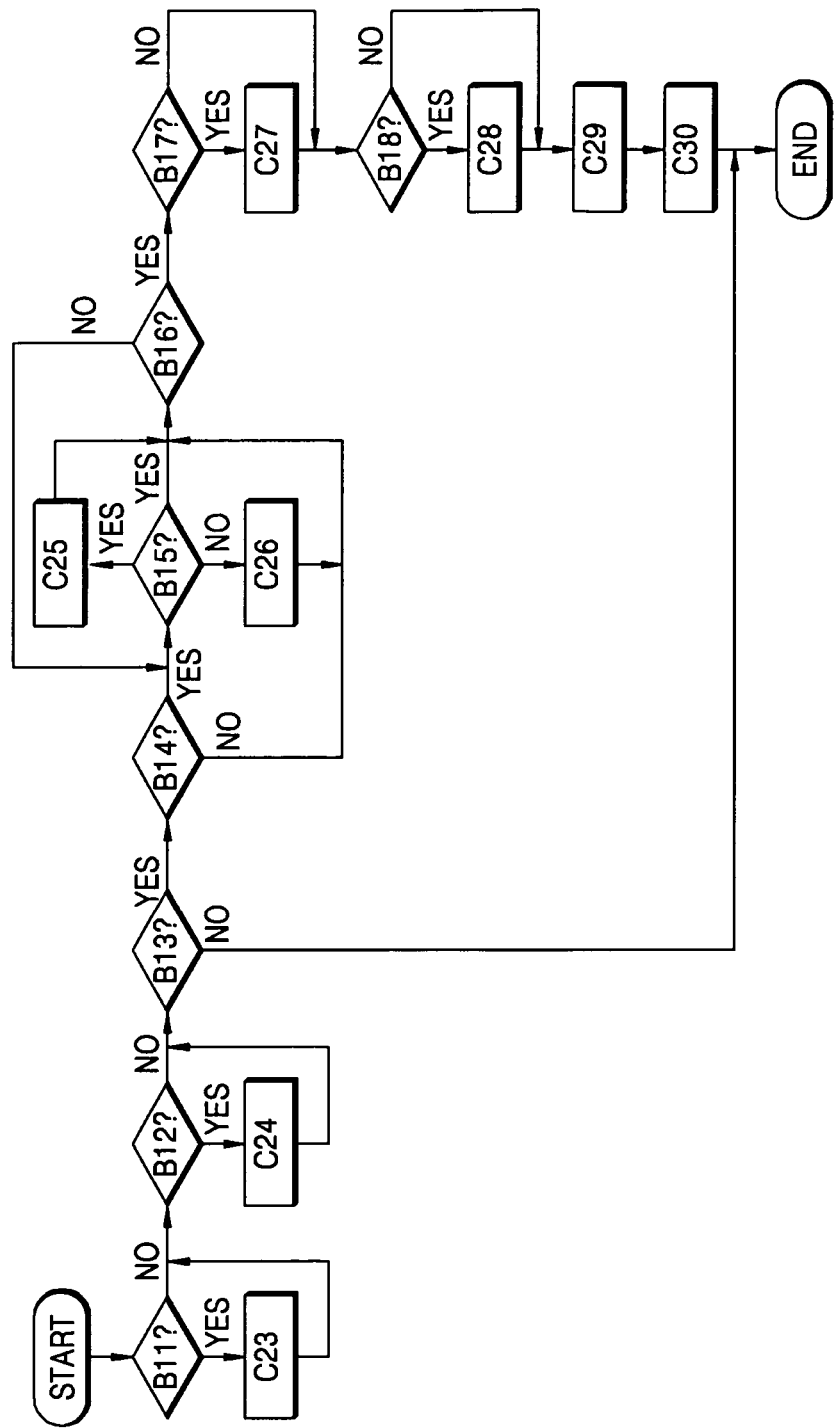
FIG. 14 illustrates a flow in pixel processing where branching blocks and code blocks are mixed.

FIG. 14 illustrates a flow in pixel processing where branching blocks and code blocks are mixed.

Referring to FIG. 14, after the characteristic of input 3D graphics data related to pixel processing is analyzed, if a decision result in a branching block B11 is YES, a code block C23 is executed. If the decision result is NO, a decision is made in a branching block B12. If a decision result in the branching block B12 is YES, a code block C24 is executed. If the decision result in the branching block B12 is NO, a decision is made in a branching block B13. If a decision result in the branching block B13 is NO, pixel processing is terminated. If the decision result in the branching block B13 is YES, a decision is made in a branching block B14. If a decision result in the branching block B14 is NO, a decision is made in a branching block B16. If the decision result in the branching block B14 is YES, a decision is made in a branching block B15. If a decision result in the branching block B15 is YES, a code block C25 is executed and a decision is made in a branching block B16. If the decision result in the branching block B15 is NO, a code block C26 is executed and a decision is made in a branching block B16. If a decision result in the branching block B16 is NO, a decision is made in a branching block B15. If the decision result in the branching block B16 is YES, a decision is made in a branching block B17. If a decision result in the branching block B17 is YES, a code block C27 is executed. If the decision result in the branching block B17 is NO, a decision is made in a branching block B18. If a decision result in the branching block B18 is NO, code blocks C29 and C30 are executed. If the decision result in the branching block B18 is YES, the code blocks C28 through C30 are executed and pixel processing is terminated.

FIG. 15 illustrates contents of the branching blocks in the flow shown in FIG. 14.

The data analyzing unit 610 analyzes the characteristic of input 3D graphics data, which is related to pixel processing, and provides characteristic information according to decisions of the branching blocks as shown in FIG. 15 to the function reconstructing unit 640.

FIG. 16 illustrates contents of the code blocks in the flow shown in FIG. 14.

Once the function reconstructing unit 640 receives characteristic information related to pixel processing from the data analyzing unit 610, it reads code blocks corresponding to the received characteristic information among the code blocks as shown in FIG. 16 and reconstructs a rendering function related to pixel processing by combining the read code blocks.

Figure 17A:
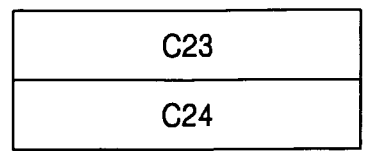
FIGS. 17A and 17B illustrate examples of a rendering function that can be created in the flow shown in FIG. 14.
Figure 17B:
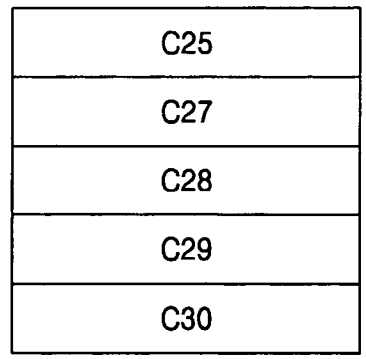

FIGS. 17A and 17B illustrate examples of a rendering function that can be created in the flow shown in FIG. 14.

Referring to FIG. 17A, a rendering function 1 is comprised of the code blocks C23 and C24.

Referring to FIGS. 14 and 15, the data analyzing unit 610 analyzes the characteristic of input 3D graphics data, decides YES as a decision in the branching block B11 in which it is determined whether Z testing should be performed, decides YES as a decision in the branching block B12 in which it is determined whether stencil testing should be performed, and decides NO as a decision in the branching block B13 in which it is determined whether a current pixel is to be rendered as a result of Z testing and stencil testing. The data analyzing unit 610 provides the characteristic information of the input 3D graphics data, which is related to vertex processing, to the function reconstructing unit 640.

The function reconstructing unit 640 reads the code blocks C23 and C24 corresponding to the received characteristic information related to pixel processing among the code blocks C23 through C30 as shown in FIG. 16 and reconstructs a rendering function 1 by combining the read code blocks C23 and C24.

Referring to FIG. 13B, a rendering function 2 is comprised of code blocks C25, C27, C28, C29, and C30.

Referring to FIGS. 14 and 15, the data analyzing unit 610 analyzes the characteristic of input 3D graphics data, decides NO as a decision in the branching block B11 in which it is determined whether Z testing should be performed, decides NO as a decision in the branching block B12 in which it is determined whether stencil testing should be performed, decides YES as a decision in the branching block B13 in which it is determined whether a current pixel is to be painted as a result of Z testing and stencil testing, decides YES as a decision in the branching block B14 in which it is determined whether texture information exists, decides YES as a decision in the branching block B15 in which it is determined whether perspective correction should be performed, decides YES as a decision in the branching block B16 in which it is determined whether the entire texture processing is completed, decides YES as a decision in the branching block B17 in which it is determined whether alpha testing and blending should be performed, and decides YES as a decision in the branching block B18 in which it is determined whether fog calculation should be performed. The data analyzing unit 610 provides characteristic information of 3D graphics data, which is related to pixel processing, to the function reconstructing unit 640.

The function reconstructing unit 640 reads the code blocks C25, C27, C28, C29, and C30 corresponding to the received characteristic information related to pixel processing among the code blocks C23 through C30 as shown in FIG. 16 and reconstructs a rendering function by combining the read code blocks C25, C27, C28, C29, and C30. The reconstructed rendering function includes only code blocks that should be processed according to the characteristic of 3D graphics data to be rendered, but does not include any branching block.

According to the above-described embodiments, the characteristic of 3D graphics data to be rendered is analyzed and a rendering function is reconstructed only using code blocks corresponding to the analyzed characteristic, thereby minimizing the size of the rendering function. Since a rendering function is reconstructed with only necessary code blocks, the amount of branching commands in the rendering function can be minimized and time required to execute the rendering function can also be reduced.

In addition, by implementing a cache that manages reconstructed rendering functions, time required to reconstruct a rendering function can also be saved.

Therefore, according to the above-described embodiments of the present invention, it is possible to render 3D data in a memory restricted environment and minimize power consumption.

Methods of the present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of rendering 3D graphics data, the method comprising:
   determining one or more characteristics of the 3D graphics data;
   analyzing the determined one or more characteristics of the 3D graphics data using plural select branching elements;
   selecting required plural code blocks, from plural available code blocks, according to a decision result of the plural select branching elements, based on the analyzed one or more characteristics of the 3D graphics data;
   using a processor to reconstruct a rendering function based on the required plural code blocks,
   wherein the reconstructing comprises combining the required plural select code blocks, from the plural available code blocks, represented by the plural select branching elements selected from plural available branching elements, such that the plural select branching elements includes less than all of the plural available branching elements based on the analyzed characteristics of the 3D graphics data, and such that the reconstructed rendering function includes the required plural select code blocks, less than all of the plural available code blocks; and
   rendering the 3D graphics data using the called reconstructed rendering function,
   wherein at least a single branching element of the plural available branching elements identifies a distinct grouping of plural code blocks, of the plural available code blocks, for inclusion in the reconstructed rendering function, for the rendering of the 3D graphics data using the reconstructed rendering function searching for a rendering function corresponding to the analyzed characteristic of the 3D graphics data from a cache;
   reading the rendering function from the cache when the rendering function exists in the cache;
   reconstructing the rendering function based on the analyzed characteristic of the 3D graphics data when the rendering function does not exist in the cache.

2. The method of claim 1, wherein the reconstructing of the rendering function comprises reading a code block, which is a meaningful functional unit, selected by the plural select branching elements according to the decision result of the plural select branching elements, based on the analyzed characteristics of the 3D graphics data, from a memory, including the required plural available code blocks, and reconstructing the rendering function using the read code block.

3. The method of claim 2, further comprising storing the reconstructed rendering function in a cache.

4. The method of claim 3, further comprising:
   deleting one of plural rendering functions stored in the cache, which is least used or recently least used, when there is no space for storing the reconstructed rendering function in the cache; and
   storing the reconstructed rendering function in a space that was occupied by the deleted rendering function.

5. The method of claim 1, further comprising counting a total number of times a corresponding rendering function is used; and
   counting a total number of times a corresponding rendering function is used over a predetermined interval.

6. The method of claim 1, wherein the reconstructing the rendering function further comprises reconstructing a rendering function for each object of the 3D graphics data to be rendered.

7. The method of claim 1, wherein the single branching element identifies a distinct predetermined set of plural code blocks.

8. A method of rendering 3D graphics data, the method comprising:
   determining a characteristic of the 3D graphics data;
   analyzing the determined characteristic of the 3D graphics data using plural select branching elements;
   selecting required plural code blocks, from plural available code blocks, according to a decision result of the plural select branching elements, based on the analyzed characteristic of the 3D graphics data;
   using a processor for reconstructing a rendering function based on the required plural code blocks,
   wherein the reconstructing comprises removing branching elements from the rendering function based on the analyzed characteristic, such that the reconstructed rendering function includes the required plural select code blocks, less than all of the plural available code blocks;
   rendering the 3D graphics data using the reconstructed rendering function; and
   storing the reconstructed rendering function in a cache,
   wherein the reconstructing of the rendering function comprises reading a select code block, from the plural available code blocks, that is a meaningful functional unit, corresponding to the analyzed characteristic of the 3D graphics data, from a code block memory and reconstructing the rendering function to include the read code block,
   the method further comprising:
   deleting one of plural rendering functions stored in the cache, which is least used or recently least used, when there is no space for storing the reconstructed rendering function in the cache; and
   storing the reconstructed rendering function in a space that was occupied by the deleted rendering function,
   wherein at least a single branching element of plural available branching elements identifies a distinct grouping of plural code blocks, of the plural available code blocks, for inclusion in the reconstructed rendering function, for the rendering of the 3D graphics data using the reconstructed rendering function.

9. A method of rendering 3D graphics data, the method comprising:
   determining a characteristic of the 3D graphics data;
   analyzing the determined characteristic of the 3D graphics data using plural select branching elements;
   selecting required plural code blocks, from plural available code blocks, according to a decision result of the plural select branching elements, based on the analyzed characteristic of the 3D graphics data;

using a processor for reconstructing a rendering function based on the required plural code blocks, wherein the reconstructing comprises removing branching elements from the rendering function based on the analyzed characteristic, such that the reconstructed rendering function includes the required plural select code blocks, less than all of the plural available code blocks; and rendering the 3D graphics data using the reconstructed rendering function, wherein the reconstructing of the rendering function comprises:

searching for a rendering function corresponding to the analyzed characteristic of the 3D graphics data from a cache;

reading the rendering function from the cache when the rendering function exists in the cache; and reconstructing the rendering function with the plural available code blocks based on the analyzed characteristic of the 3D graphics data when the rendering function does not exist in the cache, wherein at least a single branching element of plural available branching elements identifies a distinct grouping of plural code blocks, of the plural available code blocks, for inclusion in the reconstructed rendering function, for the rendering of the 3D graphics data using the reconstructed rendering function.

10. A method of rendering 3D graphics data, the method comprising:

determining one or more characteristics of the 3D graphics data;

analyzing the determined characteristics of the 3D graphics data using plural select branching elements;

selecting required plural code blocks, from plural available code blocks, according to a decision result of the plural select branching elements, based on the analyzed characteristics of the 3D graphics data;

reading the required plural select code blocks, from the plural available code blocks in a memory, corresponding to the analyzed characteristics of the 3D graphics data, from the memory;

reconstructing a rendering function by combining the required plural select code blocks such that the reconstructed rendering function includes the required plural select code blocks, less than all of the plural available code blocks; and rendering the input 3D graphics data using the reconstructed rendering function, wherein, in the reconstructing of the rendering function, the required plural select code blocks are selectively read from the plural available code blocks in one or more distinct groupings of code blocks, from plural groupings of the plural available code blocks, for inclusion in the reconstructed rendering function with less than all of the plural groupings, according to the select branching element, of plural available branching elements, with at least a single branching element of the plural available branching elements identifying a group, of the one or more distinct groupings of the code blocks for the rendering of the 3D graphics data using the reconstructed rendering function searching for a rendering function corresponding to the analyzed characteristic of the 3D graphics data from a cache;

reading the rendering function from the cache when the rendering function exists in the cache;

reconstructing the rendering function based on the analyzed characteristic of the 3D graphics data when the rendering function does not exist in the cache.

11. A method of reconstructing a rendering function to render 3D graphics data, the method comprising:

dividing codes included in a rendering function into meaningful functional code blocks;

determining one or more characteristics of the 3D graphics data to be rendered;

analyzing the determined characteristics of the 3D graphics data using plural select branching elements;

extracting required plural select code blocks, from plural available code blocks, according to a decision result of the plural select branching elements, based on the analyzed characteristics of the 3D graphics data to be rendered; and using a processor to reconstruct a rendering function by combining the required plural select code blocks, such that the reconstructed rendering function includes the required plural select code blocks, less than all of the plural available code blocks, wherein the required plural select code blocks are selectively extracted from the plural available code blocks in one or more distinct groupings of code blocks, from plural groupings of the plural available code blocks, for inclusion in the reconstructed rendering function with less than all of the plural groupings, according to a select branching element, of plural available branching elements, with at least a single branching element of the plural available branching elements identifying a group, of the one or more distinct groupings of the code blocks for the rendering of the 3D graphics data using the reconstructed rendering function searching for a rendering function corresponding to the analyzed characteristic of the 3D graphics data from a cache;

reading the rendering function from the cache when the rendering function exists in the cache;

reconstructing the rendering function based on the analyzed characteristic of the 3D graphics data when the rendering function does not exist in the cache.

12. An apparatus for rendering 3D graphics data, the apparatus comprising:

a rendering unit determining one or more characteristics of the 3D graphics data, analyzing the determined characteristics of the 3D graphics data using plural select branching elements, selecting required plural code blocks, from plural available code blocks, according to a decision result of the plural select branching elements, based on the determined characteristics of the 3D graphics data, and reconstructing a rendering function by combining the required plural select code blocks, from the plural available code blocks, represented by one or more select branching elements selected from the plural available branching elements, such that the one or more select branching elements is less than all of the plural available branching elements based on the analyzed characteristics of the 3D graphics data, and such that the reconstructed rendering function includes the required plural select code blocks, less than all of the plural available code blocks; and a presenting unit rendering the 3D graphics data using the reconstructed rendering function, wherein the rendering unit includes a cache to store rendering functions, and wherein, in the reconstruction of the rendering function by the rendering unit, at least a single branching element of the plural available branching elements identifies the required plural select code blocks, of the plural available code blocks, for inclusion in the reconstructed rendering function, for the rendering of the 3D graphics data using the reconstructed rendering function searching for a rendering function corresponding to the analyzed characteristic of the 3D graphics data from a cache;

reading the rendering function from the cache when the rendering function exists in the cache;

reconstructing the rendering function based on the analyzed characteristic of the 3D graphics data when the rendering function does not exist in the cache.

13. The apparatus of claim 12, wherein the rendering unit reads a code block that is a meaningful functional unit, corresponding to the analyzed characteristics of the 3D graphics data, from a code block memory and reconstructs the rendering function using the read code block.

14. The apparatus of claim 13, wherein the rendering unit stores the reconstructed rendering function in the cache.

15. The apparatus of claim 14, wherein the rendering unit deletes one of rendering functions stored in the cache, which is least used or recently least used, when there is no space for storing the reconstructed rendering function in the cache and stores the reconstructed rendering function in a space that was occupied by the deleted rendering function.

16. An apparatus for rendering 3D graphics data, the apparatus comprising:

a data analyzing unit determining one or more characteristics of the 3D graphics data and analyzing the determined characteristics of the 3D graphics data using plural select branching elements, selecting required plural code blocks, from plural available code blocks, according to a decision result of the plural select branching elements, based on the determined characteristics of the 3D graphics data;

a function reconstructing unit reading the required plural select code blocks from a memory, from the plural available code blocks in the memory, based on the analyzed characteristics of the 3D graphics data, and reconstructing a rendering function by combining the required plural select code blocks, such that the reconstructed rendering function includes the required plural select code blocks, less than all of the plural available code blocks; and a cache to store rendering functions, wherein, in the reconstruction of the rendering function by the function reconstruction unit, at least one select code block is selected from the plural available code blocks in one or more distinct groupings of code blocks, from plural groupings of the plural available code blocks, for inclusion in the reconstructed rendering function with less than all of the plural groupings, according to a select branching element, of plural available branching elements, with at least a single branching element of the plural available branching elements identifying a group, of the one or more distinct groupings of the code blocks for the rendering of the 3D graphics data using the reconstructed rendering function searching for a rendering function corresponding to the analyzed characteristic of the 3D graphics data from a cache;

reading the rendering function from the cache when the rendering function exists in the cache;

reconstructing the rendering function based on the analyzed characteristic of the 3D graphics data when the rendering function does not exist in the cache.

17. The apparatus of claim 16, wherein the function reconstructing unit stores the reconstructed rendering function in the cache.

18. A method of preventing an inclusion of unnecessary code blocks in a 3D graphics data rendering function, comprising:

determining one or more characteristics of 3D graphics data;

analyzing the determined characteristics of the 3D graphics data using plural select branching elements;

selecting required plural code blocks, from plural available code blocks, according to a decision result of the plural select branching elements, based on the determined characteristics of the 3D graphics data; and obtaining a suitable rendering function by:

searching stored one or more rendering functions stored in a cache for a rendering function corresponding to the analyzed characteristics;

selecting, upon the rendering function corresponding to the analyzed characteristics being found in the cache, the rendering function corresponding to the analyzed characteristics as the suitable rendering function; and reconstructing a rendering function, upon the rendering function corresponding to the analyzed characteristics being determined to not be found in the cache, as the suitable rendering function, by reading from plural available code blocks stored in a memory the required plural select code blocks determined to be corresponding to the analyzed characteristics and combining the required plural select code blocks to construct the reconstructed rendering function, wherein the reconstructed rendering function corresponding to the analyzed characteristics is a function having the plural select code blocks, of the plural available code blocks, less than all of the required plural available code blocks, for the rendering of the 3D graphics data using the reconstructed rendering function, wherein at least a single branching element of plural available branching elements identifies a distinct grouping of plural code blocks, of the plural available code blocks, for inclusion in the reconstructed rendering function, for the rendering of the 3D graphics data using the reconstructed rendering function.

19. A non-transitory computer-readable recording medium having recorded thereon processing instructions for causing a processor to execute a method of rendering 3D graphics data, the method comprising:

determining one or more characteristics of the 3D graphics data;

analyzing the determined one or more characteristics of the 3D graphics data using plural select branching elements;

selecting required plural code blocks, from plural available code blocks, according to a decision result of the plural select branching elements, based on the determined one or more characteristics of the 3D graphics data;

reconstructing a rendering function, including combining the required plural select code blocks, from plural available code blocks, represented by one or more select branching elements selected from the plural available branching elements, such that the plural select branching elements includes less than all of the plural available branching elements based on the analyzed characteristics of the 3D graphics data, and such that the reconstructed rendering function includes the required plural select code blocks, less than all of the plural available code blocks; and rendering the 3D graphics data using the reconstructed rendering function, wherein at least a single branching element of the plural available branching elements identifies a distinct grouping of plural code blocks, of the plural available code blocks, for inclusion in the reconstructed rendering function, for the rendering of the 3D graphics data using the reconstructed rendering function searching for a rendering function corresponding to the analyzed characteristic of the 3D graphics data from a cache;

reading the rendering function from the cache when the rendering function exists in the cache;

reconstructing the rendering function based on the analyzed characteristic of the 3D graphics data when the rendering function does not exist in the cache.

20. A non-transitory computer-readable recording medium having recorded thereon processing instructions for causing a processor to execute a method of rendering 3D graphics data, the method comprising:

determining one or more characteristics of the 3D graphics data;

analyzing the determined characteristic of the 3D graphics data using plural select branching elements;

reading required plural select code blocks, from plural available code blocks in a memory, according to a decision result of the plural select branching elements, based on the analyzed characteristics of the 3D graphics data, from the memory;

reconstructing a rendering function by combining the required plural select code blocks, such that the reconstructed rendering function includes the required plural select code blocks, less than all of the plural available code blocks; and rendering the 3D graphics data using the reconstructed rendering function, wherein, in the reconstructing of the rendering function, the required plural select code blocks are selectively read from the plural available code blocks in one or more distinct groupings of code blocks, from plural groupings of the plural available code blocks, for inclusion in the reconstructed rendering function with less than all of the plural groupings, according to a select branching element, of plural available branching elements, with at least a single branching element of the plural available branching elements identifying a group, of the one or more distinct groupings of code blocks for the rendering of the 3D graphics data using the reconstructed rendering function searching for a rendering function corresponding to the analyzed characteristic of the 3D graphics data from a cache;

reading the rendering function from the cache when the rendering function exists in the cache;

reconstructing the rendering function based on the analyzed characteristic of the 3D graphics data when the rendering function does not exist in the cache.

21. A non-transitory computer-readable recording medium having recorded thereon processing instructions for causing a processor to execute a method of reconstructing a rendering function to render 3D graphics data, the method comprising:

dividing codes included in a rendering function into meaningful functional code blocks;

determining one or more characteristics of the 3D graphics data to be rendered;

analyzing the determined characteristics of the 3D graphics data using plural select branching elements;

extracting required plural select code blocks, from plural available code blocks, according to a decision result of the plural select branching elements, based on the analyzed characteristics of the 3D graphics data to be rendered; and reconstructing a rendering function by combining the required plural select code blocks, such that the reconstructed rendering function includes the required plural select code blocks, less than all of the plural available code blocks, wherein, in the reconstructing of the rendering function, the required plural select code blocks are selectively extracted from the plural available code blocks in one or more district groupings of code blocks, from plural groupings of the plural available code blocks, for inclusion in the reconstructed rendering function with less than all of the plural groupings, according to a select branching element, of plural available branching elements, with at least a single branching element of the plural available branching elements identifying a group, of the one or more distinct groupings for the rendering of the 3D graphics data using the reconstructed rendering function searching for a rendering function corresponding to the analyzed characteristic of the 3D graphics data from a cache;

reading the rendering function from the cache when the rendering function exists in the cache;

reconstructing the rendering function based on the analyzed characteristic of the 3D graphics data when the rendering function does not exist in the cache.

22. A non-transitory computer-readable recording medium having recorded thereon processing instructions for causing a processor to execute a method of preventing an inclusion of unnecessary code blocks in a 3D graphics data rendering function, the method comprising:

determining one or more characteristics of 3D graphics data;

analyzing the determined characteristics of the 3D graphics data using plural select branching elements;

selecting required plural code blocks, from plural available code blocks, according to a decision result of the plural select branching elements, based on the determined characteristics of the 3D graphics data; and obtaining a suitable rendering function for rendering the 3D graphics data by:

searching a cache for one or more rendering functions, stored in the cache, for a rendering function corresponding to the analyzed characteristics;

selecting, upon the rendering function corresponding to the analyzed characteristics being found in the cache, the rendering function corresponding to the analyzed characteristics as the suitable rendering function; and reconstructing a rendering function, upon the rendering function corresponding to the analyzed characteristics not being found in the cache, as the suitable rendering function, by reading from plural available code blocks stored in a memory the required plural select code blocks determined to be corresponding to the analyzed characteristics and combining the required plural select code blocks to construct the reconstructed rendering function, such that the reconstructed rendering function includes the required plural select code blocks, less than all of the plural available code blocks for the rendering of the 3D graphics data using the reconstructed rendering function, wherein at least a single branching element of plural available branching elements identifies a distinct grouping of plural code blocks, of the plural available code blocks, for inclusion in the reconstructed rendering function, for the rendering of the 3D graphics data using the reconstructed rendering function.

23. A method of rendering 3D graphics data, the method comprising:

determining one or more characteristics of the 3D graphics data;

analyzing the determined characteristics of the 3D graphics data using plural select branching elements;

selecting required plural code blocks, from plural available code blocks, according to a decision result of the plural select branching elements, based on the analyzed characteristics of the 3D graphics data;

searching stored rendering functions in a cache for a rendering function corresponding to the analyzed characteristics;

reading the rendering function from the cache upon the searching indicating that the rendering function is stored in the cache, and reconstructing the rendering function upon the searching indicating that the rendering function is not stored in the cache, including combining the required plural select code blocks read from a memory storing the plural available code blocks, to construct the reconstructed rendering function with less than all of the plural available code blocks, based on the analyzed characteristics, wherein the memory is distinct from the cache and the reconstructing of the rendering function and reading of the required plural select code blocks are both controlled to not be performed when the searching indicates that the rendering function is stored in the cache; and rendering the 3D graphics data selectively using one of the read rendering function and the reconstructed rendering function, wherein at least a single branching element of plural available branching elements identifies a distinct grouping of plural code blocks, of the plural available code blocks, for inclusion in the reconstructed rendering function, for the rendering of the 3D graphics data using the reconstructed rendering function.

24. An apparatus for rendering input 3D graphics data, the apparatus comprising:

a cache including one or more stored rendering functions constructed with required plural code blocks based upon respective characteristics of different 3D graphics data;

a data analyzing unit determining one or more characteristics of the 3D graphics data, and analyzing the determined characteristics of the 3D graphics data using plural select branching elements;

a function reconstructing unit to search, within the cache, for a rendering function that is suitable for rendering the 3D graphics data based on the analyzed characteristics of the 3D graphics, to read the rendering function from the cache upon the searching of the cache indicating that the rendering function is stored in the cache, and to reconstruct the rendering function upon the searching of the cache indicating that the cache does not include the rendering function, with the reconstructing of the rendering function including reading the required plural select code blocks according to a decision result of the plural select branching elements, based on the analyzed characteristics of the 3D graphics data, from a memory, distinct from the cache and including the plural available code blocks, based upon the analyzed characteristics of the 3D graphics data and combining the required plural select code blocks to construct a reconstructed rendering function, such that the reconstructed rendering function includes the required plural select code blocks, less than all of the plural available code blocks; and a rendering engine rendering the 3D graphics data selectively using one of the read rendering function and the reconstructed rendering function, wherein at least a single branching element of plural available branching elements identifies a distinct grouping of plural code blocks, of the plural available code blocks, for inclusion in the reconstructed rendering function, for the rendering of the 3D graphics data using the reconstructed rendering function.

25. An apparatus for rendering 3D graphics data, the apparatus comprising:

a first rendering unit to determine one or more vertex processing characteristics of the 3D graphics data, analyze the determined vertex processing characteristics of the 3D graphics data using plural select branching elements and select required vertex processing related plural code blocks, from plural available code blocks, according to a decision result of the plural select branching elements, based on the analyzed vertex processing characteristics of the 3D graphics data, to selectively reconstruct a rendering function related to vertex processing by combining the required plural select vertex processing related code blocks, less than all plural available vertex processing related code blocks, corresponding to the analyzed vertex processing characteristics of the 3D graphics data, and to selectively process the required plural vertex processing related code blocks of the reconstructed rendering function related to vertex processing to render the 3D graphics data;

a second rendering unit to determine one or more pixel processing characteristics of results of the performed vertex processing of the 3D graphics data, analyze the determined pixel processing characteristics of the 3D graphics data using plural select branching elements and select required pixel processing related plural code blocks, from plural available code blocks, according to a decision result of the plural select branching elements, based on the analyzed pixel processing characteristics of the 3D graphics data, to selectively reconstruct a rendering function related to pixel processing by combining the required plural select pixel processing related code blocks, less than all plural available pixel processing related code blocks, corresponding to the analyzed pixel processing related characteristics of the results of the performed vertex processing, and to selectively process the required plural pixel processing related code blocks of the reconstructed rendering function related to pixel processing to render the 3D graphics data; and at least one cache to store one or more rendering functions related vertex processing and one or more rendering functions related to pixel processing, wherein at least a single branching element of plural available branching elements identifies a distinct grouping of plural code blocks, of the plural available code blocks, for inclusion in the reconstructed rendering function, for the rendering of the 3D graphics data using the reconstructed rendering function.

\* \* \* \* \*